(12) United States Patent
Maguire et al.

(10) Patent No.: US 8,338,710 B2
(45) Date of Patent: Dec. 25, 2012

(54) SHORT-PREVENTING SHIELD FOR WIRE HARNESS TERMINALS

(75) Inventors: Patrick Daniel Maguire, Ann Arbor, MI (US); Philip Michael Gonzales, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 12/938,801

(22) Filed: Nov. 3, 2010

(65) Prior Publication Data
US 2012/0103684 A1 May 3, 2012

(51) Int. Cl.
*H01B 7/00* (2006.01)
(52) U.S. Cl. ............... 174/135; 174/138 F; 174/84 C; 174/74 R; 324/115; 324/110
(58) Field of Classification Search ............. 174/72 A, 174/135, 84 C, 74 R; 439/217, 136, 218, 439/142
See application file for complete search history.

(56) References Cited

U.S. PATENT DOCUMENTS

| | | | |
|---|---|---|---|
| 3,049,582 A | | 8/1962 | Shinn |
| 3,157,450 A | | 11/1964 | Harrison, Sr. et al. |
| 3,966,073 A | * | 6/1976 | Geisel ........................ 220/3.8 |
| 4,017,141 A | * | 4/1977 | Bury et al. .................. 439/596 |
| 4,410,226 A | * | 10/1983 | Adduci et al. ............... 439/142 |
| 4,562,125 A | * | 12/1985 | Davis ........................... 429/65 |
| 4,643,924 A | * | 2/1987 | Uken et al. ................. 428/35.7 |
| 4,952,171 A | * | 8/1990 | Sugiyama ................... 439/522 |
| 5,166,599 A | * | 11/1992 | Hochreuther et al. ....... 324/115 |
| 5,195,912 A | * | 3/1993 | Lintott ........................ 439/685 |
| 5,229,703 A | * | 7/1993 | Harris ......................... 320/107 |
| 5,243,275 A | * | 9/1993 | Nakazawa et al. .......... 324/110 |
| 5,295,860 A | * | 3/1994 | Jozefczyk et al. ........... 439/503 |
| 5,338,898 A | * | 8/1994 | Luciano et al. .......... 174/138 F |
| 5,346,407 A | * | 9/1994 | Hood ........................... 439/522 |
| 5,346,408 A | * | 9/1994 | Chupak ....................... 439/522 |
| 5,399,103 A | * | 3/1995 | Kuboshima et al. ........ 439/509 |
| 5,413,500 A | * | 5/1995 | Tanaka ........................ 439/521 |
| 5,439,759 A | * | 8/1995 | Lippert et al. ................ 429/65 |

(Continued)

FOREIGN PATENT DOCUMENTS
GB 1406487 9/1975
(Continued)

OTHER PUBLICATIONS

GES Electronic & Service, high voltage connector, multipin HV-connector, single-pin HV-connector, power connector, industrial connector, connecting solutions, The GES-Module comming Q1 2008.

*Primary Examiner* — Chau Nguyen
*Assistant Examiner* — Theron Milliser
(74) *Attorney, Agent, or Firm* — David B. Kelley; Brooks Kushman P.C.

(57) ABSTRACT

A device for preventing electrical shorting between positive and negative terminals of a wiring harness includes a clip securable to conductors of the harness, a wall extending from the clip to be positioned between first and second terminals of the conductors when the clip, and a shield attached to the clip and movable between a first position wherein it blocks contact between a tool and the first terminal while allowing contact between the tool and the second terminal, and a second position wherein it blocks contact between the tool and the second terminal while allowing contact between the tool and the first terminal.

17 Claims, 3 Drawing Sheets

U.S. PATENT DOCUMENTS

| | | | |
|---|---|---|---|
| 5,442,337 A * | 8/1995 | Hwang | 340/635 |
| 5,576,516 A * | 11/1996 | Kameyama et al. | 174/138 F |
| 5,619,129 A * | 4/1997 | Kamiya | 324/115 |
| 5,645,448 A * | 7/1997 | Hill | 439/522 |
| 5,791,936 A * | 8/1998 | Nicholson | 439/521 |
| 5,804,770 A * | 9/1998 | Tanaka | 174/138 F |
| 5,910,029 A * | 6/1999 | Siedlik et al. | 439/522 |
| 5,954,526 A * | 9/1999 | Smith | 439/136 |
| 5,977,485 A * | 11/1999 | Yoshimura et al. | 174/138 F |
| 6,376,771 B1 * | 4/2002 | Kosuge | 174/66 |
| 6,426,465 B1 * | 7/2002 | Kosuge | 174/138 F |
| 6,499,190 B2 * | 12/2002 | Ruiz Rodriguez | 16/423 |
| 6,512,177 B2 * | 1/2003 | Kosuge | 174/66 |
| 6,576,838 B2 * | 6/2003 | Matsumura | 174/66 |
| 6,828,058 B2 * | 12/2004 | Ohtsuka et al. | 429/65 |
| 7,023,176 B2 * | 4/2006 | Maebashi et al. | 320/107 |
| 7,077,706 B1 * | 7/2006 | Yang | 439/650 |
| 7,176,780 B2 * | 2/2007 | Iwata | 337/188 |
| 7,361,841 B1 * | 4/2008 | Smolen et al. | 174/138 F |
| 7,382,611 B2 * | 6/2008 | Tracy et al. | 361/679.41 |
| 7,439,725 B2 * | 10/2008 | Fischer et al. | 324/115 |
| 7,488,201 B2 * | 2/2009 | Yoon et al. | 439/521 |
| 2002/0017008 A1 * | 2/2002 | Rodriguez | 16/423 |
| 2002/0053458 A1 * | 5/2002 | Kondo | 174/84 C |
| 2006/0028175 A1 | 2/2006 | Tsiang | |
| 2009/0149048 A1 | 6/2009 | Pavlovic et al. | |

FOREIGN PATENT DOCUMENTS

| | | |
|---|---|---|
| JP | 2008272023 A | 11/2008 |

* cited by examiner

SHORT-PREVENTING SHIELD FOR WIRE HARNESS TERMINALS

BACKGROUND

1. Technical Field

This invention relates to high voltage wire harnesses such as those used on electrically powered vehicles, and more specifically to the terminals used to connect the wires of such a harness to other components, such as a battery or other energy-storage system.

2. Background Art

Electrically powered automotive vehicles (including, but not limited to, hybrid electric vehicles and plug-in hybrid electric vehicles, and fuel-cell vehicles) generally utilize a high voltage (HV) battery, capacitor, or other energy storage system to store electric energy and deliver it to the electric traction motor. In many cases, a main wire harness is connected to one or more HV batteries at a pair of battery terminals. During the initial assembly of the vehicle and during certain service or maintenance operations, the wire harness terminals must be connected to and/or disconnected from the battery terminals. To speed and simplify such operations, the positive and negative battery terminals may be located close to one another, and the corresponding wire harness terminals are likewise closely adjacent one another at the end of the harness.

It is known to provide a terminal cover that fits over and protects both the positive and negative battery terminals and/or the wire harness terminals connected thereto during vehicle operation. The terminal cover must, however, be removed to allow the wire harness terminals to be connected to or disconnected from the battery terminals. When the cover is removed, both the battery terminals and wire harness terminals are exposed and so it is possible for a tool used to drive the threaded fastener to contact both the positive and negative terminals simultaneously, thereby causing a short-circuit condition.

An electric powertrain system may be designed such that a manual switch and/or a service disconnect must be actuated prior to gaining access to the HV harness connection. There is, however, no guarantee as to the state of an inverter and/or the charge on a capacitor. If the vehicle electrical system is ON and the inverter is not aware that the HV harness connection to the battery is being accessed, there may still be a high voltage potential on the harness. If a service technician gains access to these harness/battery connections before the electric charge on the bus has dissipated, and a tool or other implement used by the technician slips or falls into contact with the positive and negative terminals, this could result in a short circuit of the HV capacitor in the powertrain.

SUMMARY

In a first disclosed embodiment, apparatus for avoiding shorting between a first and a second terminal of a wire harness comprises a retainer securable relative to the terminals, and a shield attached to the retainer and movable between a first position wherein it blocks access to the first terminal and allows access to the second terminal and a second position wherein it blocks access to the second terminal and allows access to the first terminal. The disclosed apparatus allows connecting and/or disconnecting of wire harness terminals to respective battery terminals while protecting against inadvertent shorting between the terminals.

In a another disclosed embodiment, a short prevention device for use with a wiring harness having a first conductor and a second conductor comprises a clip securable to at least one of the conductors, a wall extending from the clip to be positioned between first and second terminals of the conductors when the clip is secured to conductors, and a shield attached to the clip and movable between a first position wherein it blocks contact between a tool and the first terminal while allowing contact between the tool and the second terminal, and a second position wherein it blocks contact between the tool and the second terminal while allowing contact between the tool and the first terminal.

In a another disclosed embodiment, a wiring harness comprises a first conductor having a first terminal, a second conductor having a second terminal, a retainer secured to the first and second conductors, a wall extending from the retainer and positioned between the first and second terminal, and a shield attached to the retainer and movable between a first position wherein it blocks access to the first terminal by a tool while allowing access to the second terminal by the tool, and a second position wherein it blocks access to the second terminal while allowing access to the first terminal.

BRIEF DESCRIPTION OF THE DRAWINGS

Embodiments of the present invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
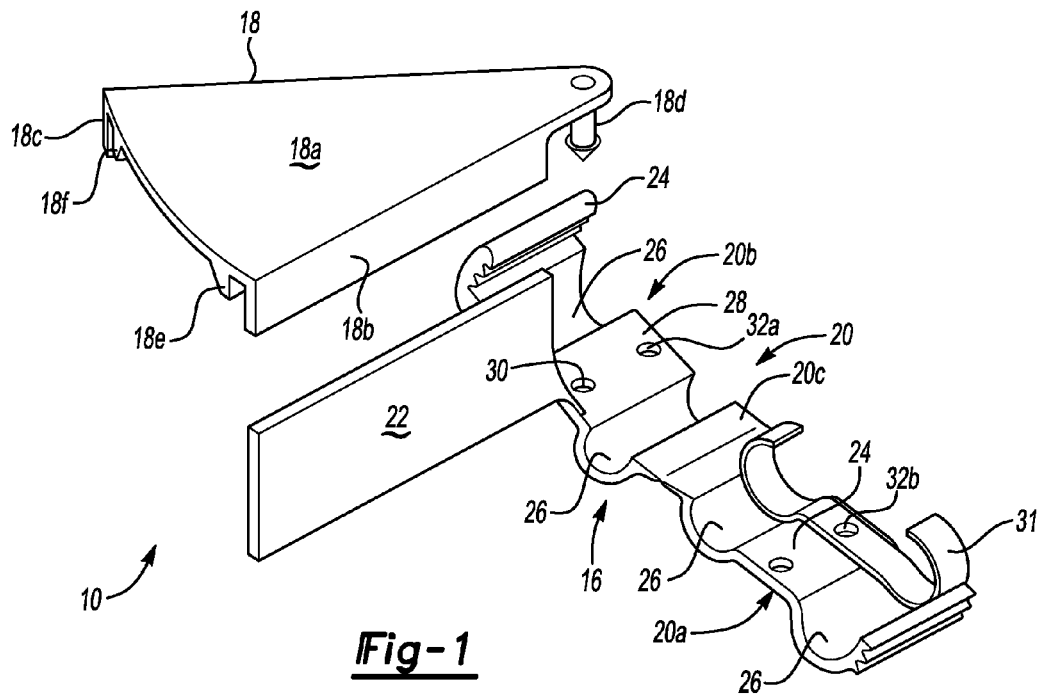
FIG. 1 is a schematic exploded view of a first embodiment of a wire harness terminal shield.
Figure 2:
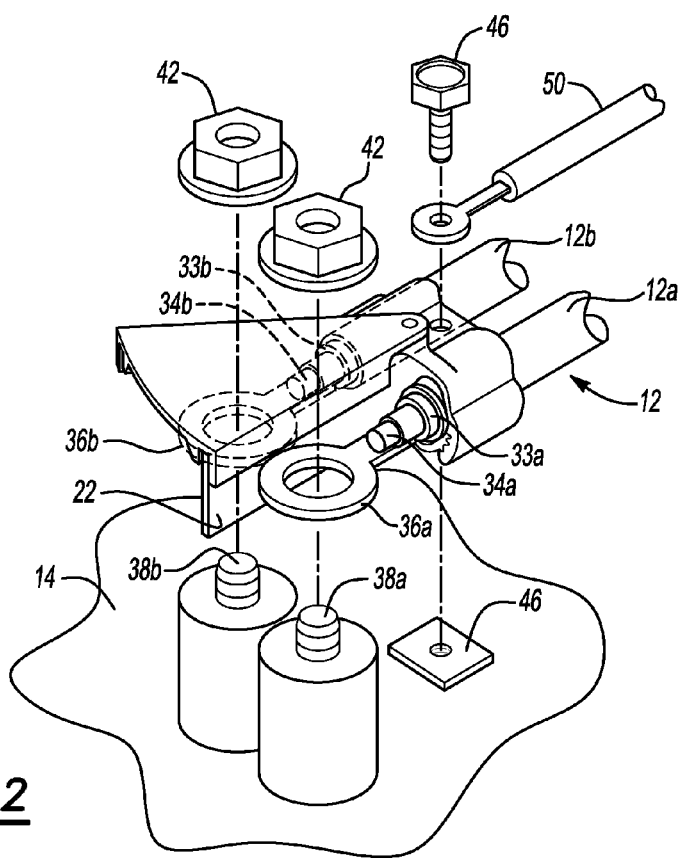
FIG. 2 is a view of the shield of FIG. 1 clipped onto a wire harness.

Referring to FIGS. 1 and 2, a short preventing device 10 is used in combination with a wiring harness 12 that may be detachably connected to a battery 14. Device 10 comprises a harness retainer 16 that is secured to wire harness 12 and a top shield 18 movably attached to the retainer.

Harness retainer 16 is preferably formed from an electrically insulating material, such as plastic, and includes a wire grip portion 20 that is secured to the two wires 12a, 12b of the harness. In the embodiment depicted, grip portion 20 is formed as a lower half 20a and an upper half 20b, which may be connected by a living hinge 20c if the part is injection molded. A wall 22 may be formed integrally with either the lower or upper grip half. A locking tab 24 is formed on upper half 20b and has ridges, teeth, or similar features which engage mating features on lower half 20a when the grip is in the closed condition shown in FIG. 2.

Grip lower half 20a includes two semi-cylindrical channels 26 separated by a bridge 24. Similarly, upper grip half 20b comprises two semi-cylindrical wire grip channels 26 separated by a bridge 28. A pivot hole 30 and a bolt hole 32a are formed in upper bridge 28, and a lower bolt hole 32b is formed in lower bridge 24.

Grip portion 20 may include an electrically conductive grounding component adjacent the inner surfaces of channels 26, shown in the disclosed embodiment as a ground strap 31 set into grip lower half 20a. Ground strap 31 may, for example, be co-molded into the position shown during the injection molding of harness retainer 15. In another alternative, ground strap 31 may be inserted into the lower or upper grip half after the retainer 15 is formed.

The above description of harness retainer 16 is by way of example only, and the device 10 may be attached to harness 12 by an appropriate alternative means, many of which will be apparent to a person of skill in the art. For example, the grip portion may be formed as a joined pair of solid (i.e., non-opening) rings, with wires 12 being inserted through the rings and terminals crimped onto the wires afterward, if necessary.

Top shield 18 is formed of an electrically insulating material, such as plastic, and includes a generally flat, wedge-shaped top wall 18a and side walls 18b, 18c extending along opposite edges of the top wall. A pivot pin 18d extends downwardly adjacent the vertex of top wall 18a and snaps into engagement with pivot hole 30 to attach the shield to harness retainer 16 as seen in FIG. 2. Detent nubs 18e, 18f extend downward from the lower surface of top shield 18a close to side walls 18b, 18c.

As depicted in FIG. 2, device 10 is used by closing upper and lower grip portions 20a, 20b around a pair of electric cables 12a, 12b, with locking tab 24 engaging mating features on lower grip portion 20a. Cables 12a, 12b may be coaxial cables of the type well known in the art, with harness terminals 36a, 36b crimped, soldered, or otherwise secured to the central power cable 34a, 34b of each cable. An outer insulation layer may be stripped from the cables near the terminals 36a, 36b to expose short lengths of an electromagnetic compatibility (EMC) shield 33a, 33b so that the EMC shield contacts ground strap 31 when harness retainer 16 is secured over the cables.

When harness retainer 16 is secured over cables 12a, 12b, wall 22 is positioned between the two harness terminals 36a, 36b to prevent the two from coming into contact with one another and top shield 18, depending on its position, blocks access to one or the other of the harness terminals. Pivot pin 18d is inserted into pivot hole 30 to secure top shield 18 to retainer 16, and so that the top shield may be rotated through an angular range between the two positions shown in FIGS. 2 and 3. In the FIG. 2 position, top shield 18 is rotated fully clockwise so that detent nub 18e snaps over the upper edge of wall 22 to retain the shield in the position shown. The parts are sufficient flexible and there is enough play between top shield 18 and retainer 16 that a service technician (not shown) may easily rotate the shield by hand in the counter-clockwise direction so that detent nub 18e passes over the top of wall 22 and, as the counter-clockwise rotation continues, detent nub 18f snaps over the top of wall 22 to secures the shield in the position shown in FIG. 3.

Device 10 and attached harness 12 may be further secured to battery 14 by a fastener 46 that is inserted downwardly through securing holes 32a, 32b formed in the top and bottom portions of grip portion 20. Fastener 46 may hold conductive strap 31 in contact with a grounding point 48 provided on top of battery 40. Alternatively or additionally, a grounding wire 50 may be provided that connects with the grounding strap 31 via fastener 46.

Grounding strap 31 may alternatively be set into the upper grip portion 20b so that it contacts EMC shields 33a, 33b on the upper sides of cables 12a, 12b. In this case, electrical continuity between grounding strap 31 and grounding wire 50 may be achieved by bolt 46.

Device 10 is employed to protect against shorting between the two wire harness terminals 36a, 36b and/or the related battery terminals 38a, 38b when the wire harness is connected to the battery. Such shorting may inadvertently occur during service of the battery and/or related electrical system which may require disconnecting harness 12 from (and/or reconnecting it to) the battery terminals 38. In the embodiment shown, battery terminals 38a, 38b include threaded, bolt-like portions over which nuts 42 are driven to fasten harness terminals 36a, 36b securely in electrical contact with the battery terminals.

If a tool such as a wrench or a socket is used by a service technician to tighten and/or remove nuts 42, device 10 impedes inadvertent electrical contact (shorting) between the two sets of positive and negative terminals 36a, 38a, and 36b, 38b such as may occur during attachment and/or removal of the wire harness from the electrical connection with the battery 40. Device 10 prevents such inadvertent shorting because wall 22 separates and insulates the two terminals/battery posts from one another and top shield 18 permits access to only one of the terminals/battery posts at a time. When the shield 18 is rotated to the clockwise position shown in FIG. 2, it blocks or impedes access to terminal 36a while exposing 36b so that a nut or other fastening device may be installed or tightened to secure the terminal to the respective battery terminal 38b. After the first harness terminal is securely connected to the battery terminal, the service technician rotates shield 18 counter-clockwise (as viewed from above) to the position shown in FIG. 3 so that the other harness terminal 36a and battery terminal 38a is exposed while the first are now covered by the shield 18.

Figure 3:
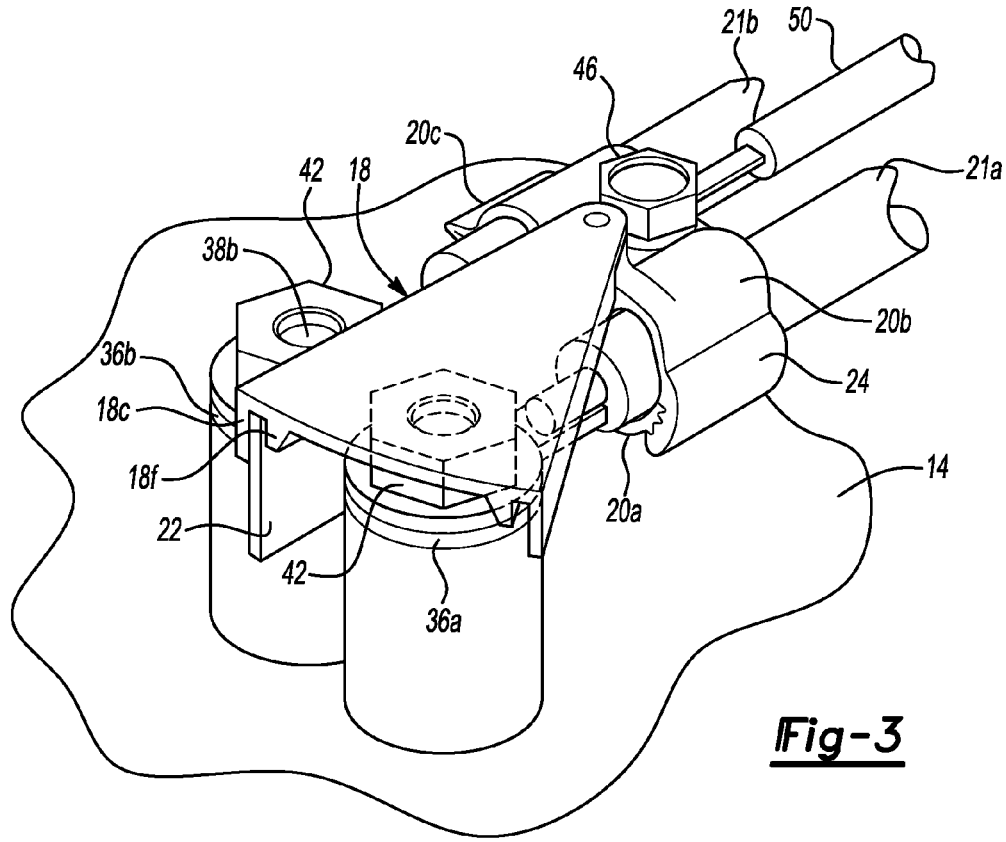
FIG. 3 is a view of the shield of FIGS. 1 and 2 in use on a wire harness secured to a pair of battery terminals.
Figure 4:
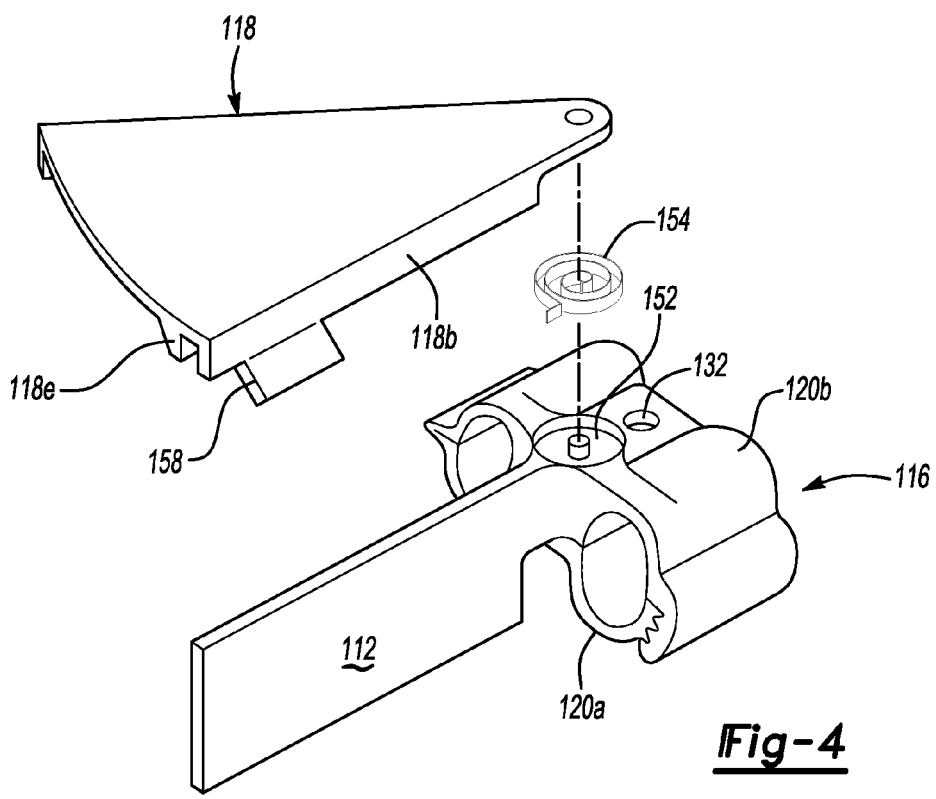
FIG. 4 is an exploded view of a second embodiment of a wire harness terminal shield.
Figure 5A:
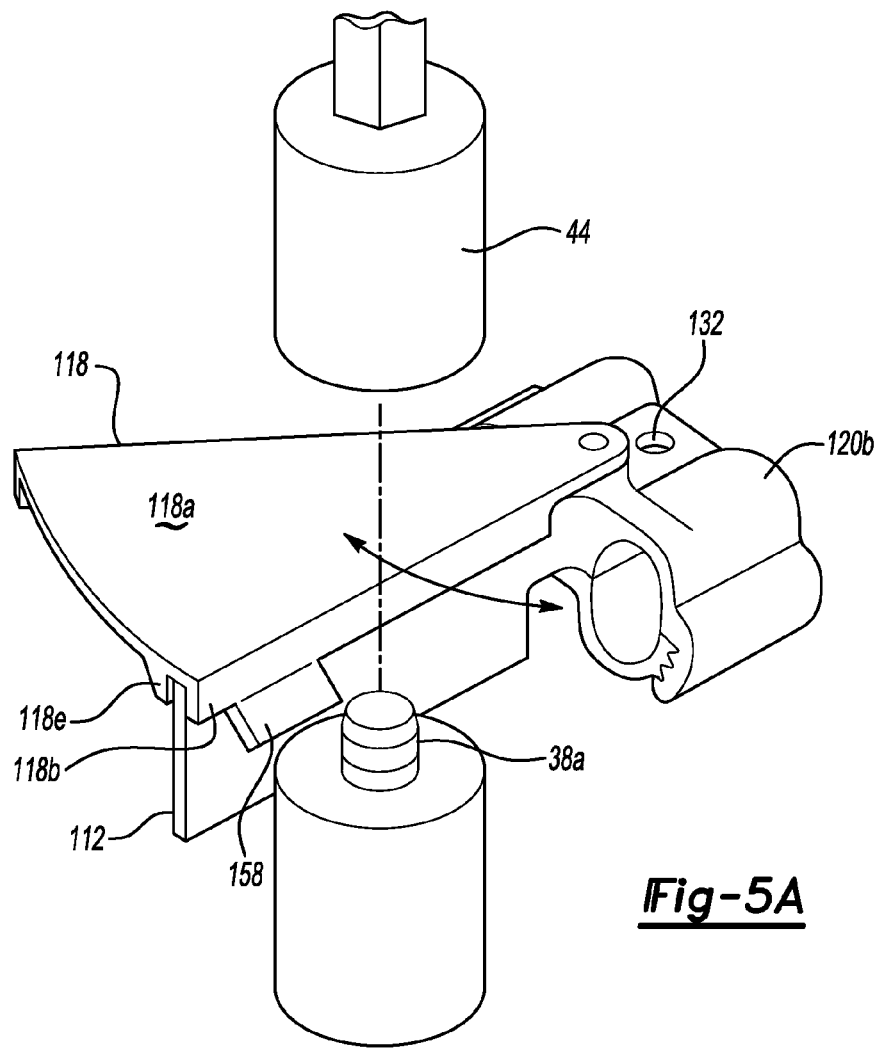
FIG. 5A is a another view of the embodiment of FIG. 4 with the top shield in a first position.
Figure 5B:
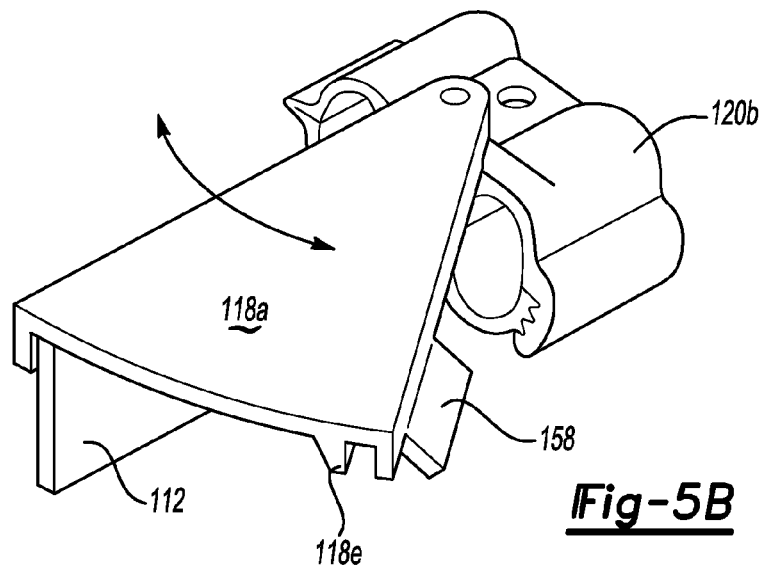
FIG. 5B is a second view of the embodiment of FIG. 4 with the top shield in a second position.

A second embodiment of a short protecting device 110 is shown in FIGS. 4, 5A, and 5B and is essentially similar to the embodiment of FIGS. 1-3, with several differences to be described below. The wire harness is not shown in these figures for clarity. Retainer portion 116 includes a recess 152 formed in the surface of upper grip half 120b. A spring 154 is held in recess 152 and has a tab 154a that presses against side wall 118b to urge top shield 118 in a counter-clockwise direction. Detent nub 136b engages wall 112 to hold top shield 118 in the position shown in FIG. 5A against the force exerted by spring 154 on the top shield.

A tab 158 extends outward and downward at an angle from shield side wall 118b so that it juts toward the uncovered side of the device 110 as seen in FIG. 5a. When a tool such as a nut driving socket 44 is moved downward over the top of battery terminal 38a to fasten a nut down onto the terminal, the outer surface of the tool presses against tab 158, twisting the tab and the adjacent portion of shield side wall 118c slightly in the clockwise direction. This twisting motion lifts detent nub 118e slightly to disengage the nub from wall 112. When tool 44 is withdrawn upwardly after the nut is secured, coil spring 154 rotates top shield 118 in the counter-clockwise direction as shown in FIG. 5B, thereby covering battery terminal 38a and exposing the opposite terminal so that the tool may be used to drive a second nut downwardly over that opposite terminal. The service technician is therefore able to quickly secure both harness terminals to their respective battery terminals without the need to manually reposition the top shield 118.

While battery 40 is shown to have upwardly projecting terminal with male threads and nuts 42 are used to secure harness terminals 36a, 36b, it also possible for female threaded features to be formed in the top of the battery with male threaded fasteners driven to secure the harness terminals in proper electrical connection with the battery.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. Apparatus comprising:
   a retainer secured to a wiring harness to maintain first and second terminals thereof in spaced-apart relationship, each terminal having a top side and an opposite bottom side; and
   a shield attached to the retainer and, when the bottom sides of the first and second terminals are in contact with respective mating terminals, rotatable about an axis between a first position blocking access to the top side of the first terminal and allowing access to the second terminal, and a second position blocking access to the top side of the second terminal and allowing access to the first terminal.

2. The apparatus according to claim 1 wherein the retainer comprises a clip engaging first and second conductors connected to the first and second terminals respectively.

3. The apparatus according to claim 2 wherein the grip comprises gripping features engaging outer surfaces of first and second conductors connected to the respective terminals.

4. The apparatus according to claim 1 wherein the retainer comprises an insulating wall positioned between the first and second terminals.

5. The apparatus according to claim 1 wherein the retainer further comprises a harness securing feature engageable with an electrical component to which the terminals are connected.

6. The apparatus according to claim 5 further comprising a grounding element configured to make electrical contact with a ground point on the electrical component when the harness securing feature is engaged with the electrical component.

7. The apparatus according to claim 6 wherein the grounding element, when the retainer is secured relative to the terminals, makes electrical contact with an electromagnetic shield surrounding an electrical conductor connected to at least one of the terminals.

8. The apparatus according to claim 1 further comprising:
   a spring biasing the shield toward the first position; and
   a latch holding the shield in the second position against the spring bias, the latch released by movement of a terminal connecting tool into proximity with the first terminal, the release of the latch and subsequent removal of the tool from proximity with the first terminal allowing the spring to move the shield to the first position.

9. The apparatus according to claim 8 wherein the latch comprises a release tab projecting from an edge of the shield, contact of the tool with the release tab releasing a wall engaging feature.

10. A device for use with a wiring harness having a first conductor and a second conductor comprising:
    a grip secured to at least one of the conductors to maintain respective first and second terminals of the conductors in spaced-apart relationship, each terminal having a top side and an opposite bottom side;
    a wall extending from the grip to be positioned between the first and second terminals; and
    a shield attached to the grip and, when the bottom sides of the first and second terminals are placed in contact with respective mating terminals, movable between a first position wherein it blocks contact between a tool and the top side of the first terminal while allowing contact between the tool and the second terminal, and a second position wherein it blocks contact between the tool and the top side of the second terminal while allowing contact between the tool and the first terminal.

11. The apparatus according to claim 10 wherein the grip comprises gripping features engaging outer surfaces of the conductors.

12. The apparatus according to claim 10 further comprising a harness securing feature attached to at least one of the grip and the wall and engageable with an electrical component to which the terminals are connected.

13. The apparatus according to claim 12 further comprising a grounding element configured to make electrical contact with a ground point on the electrical component when the harness securing feature is engaged with the electrical component.

14. The apparatus according to claim 13 wherein, when the grip is secured relative to the terminals, the grounding element provides electrical continuity between an electromagnetic shield surrounding at least one of the electrical conductors and the electrical component.

15. The apparatus according to claim 10 further comprising:
    a spring biasing the shield toward the first position; and
    a latch holding the shield in the second position against the spring bias, the latch released by contact with a connecting tool during movement of the tool into proximity with the first terminal, the release of the latch and subsequent removal of the tool from proximity with the first terminal allowing the spring to move the shield to the first position.

16. The apparatus according to claim 15 wherein the latch comprises a release tab projecting from an edge of the shield, contact of the tool with the release tab releasing a wall engaging feature.

17. A wiring harness comprising:
    a first conductor having a first terminal with a top side and an opposite bottom side;
    a second conductor having a second terminal with a top side and an opposite bottom side;
    a retainer secured to the first and second conductors and maintaining the first and second terminals in spaced-apart relationship;
    a wall extending from the retainer and positioned between the first and second terminal; and
    a shield attached to the retainer and, when the bottom sides of the first and second terminals are placed in contact with respective mating terminals, movable between a first position wherein it blocks access to the top side of the first terminal while allowing access to the second terminal, and a second position wherein it blocks access to the top side of the second terminal while allowing access to the first terminal.

* * * * *